April 25, 1944.   J. D. LANGDON   2,347,199
CHECK VALVE DEVICE
Filed Jan. 28, 1942
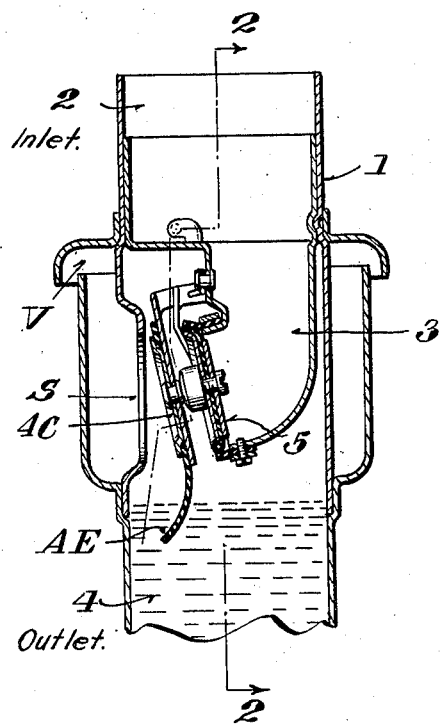
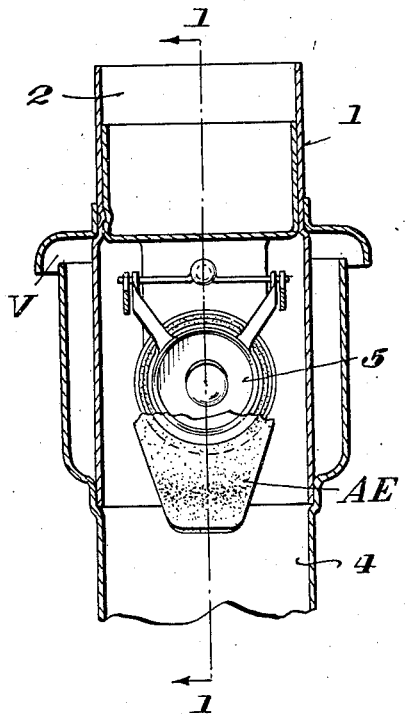
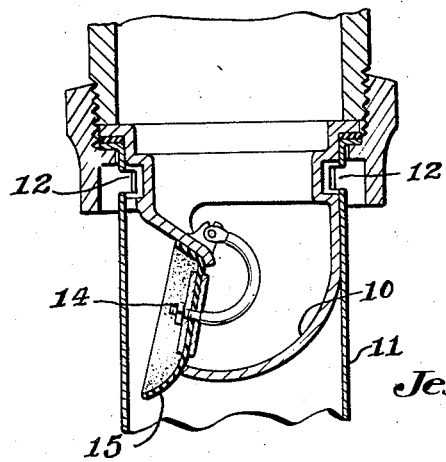
Jesse D. Langdon
INVENTOR.
BY Henry J. Lucke
Attorney Patented Apr. 25, 1944

2,347,199

UNITED STATES PATENT OFFICE 2,347,199

CHECK VALVE DEVICE

Jesse D. Langdon, Downey, Calif.

Application January 28, 1942, Serial No. 428,601

2 Claims. (Cl. 251—118)

This application is a continuation in part of my copending application Serial No. 415,165, filed October 16, 1941.

This invention relates to check valve devices for closing syphon breaker air vents in the casing of backflow preventers and the like.

The primary object is to provide means to aid the closing of air vents in a check valve casing by a check valve, prior to the time water rising in an outlet extension of the check valve casing can cause spitting of liquid thru said air vents.

A further object is to provide an apron extension from a swinging check valve whereby the check valve is urged toward a seat to close air vents in a backflow preventer casing prior to the rise of liquid in the outlet of the casing reaching the level of the air vents.

Other and further objects will appear as the specification proceeds.

The reduction to practice shown by the drawing is for the purpose of illustration only and may be changed within the scope of the claims.

Of the drawing—

Fig. 1 is a vertical section as at 1—1 Fig. 2 showing casing 1, inlet 2, intermediate outlet 3, outlet 4, check valve 5, and air check AC having apron extension AE.

Fig. 2 shows a vertical section taken on lines 2—2 of Fig. 1.

Fig. 3 shows a second embodiment of the invention.

Referring to the drawing, my improved check valve comprises a tubular casing 1, the inlet of which is at 2. A side wall of said casing is formed with an aperture communicating with the atmosphere, the wall of said casing about said aperture having a valve-seat formation S. Air vent V is protected by a cowl, as shown.

Within the casing 1 is a check valve, the body 3 of which has an inlet opening which may be the full area of inlet 2 of casing 1, and an outlet disposed adjacent, and directed toward, the valve seat S. A pivoted valve disc 5 is biased into closing relationship with the check valve outlet, and opens under pressure of liquid flowing therethrough.

Associated with said valve disc 5 is a second valve member AC for closing relationship with the valve seat S. Valve member AC is so pivoted with relation to the valve disc 5 that it follows said valve disc away from the seat S to leave said seat normally open and the interior of the casing 1 in normal free communication with the atmosphere.

Projecting from the valve disc AC is an extension AE obliquely curved toward the wall of the casing beneath the aperture; the angle of such curvature is such that when the valve structure is in the Fig. 1 position, the extension AE presents a sloping surface against which water rising in the outlet end 4 of the casing 1 will strike to urge the disc AC clockwise of Fig. 1 to seat against the valve seat S.

If because of some abnormal condition water is surged upwardly in the casing 1, the impingement of the water against the angularly sloping extension AE would cause the valve disc AC to be moved into closing relationship with the aperture and would prevent water from being spurted out through the aperture and hence out through the vent V.

In the embodiment of the invention illustrated in Fig. 3. the valve 10 is inset into the tubular casing 11, said tubular casing 11 having adjacent its upper end, airports 12 cut through a wall thereof.

The valve disc 14 is normally in engagement with the outlet of the valve 10 and a downwardly and obliquely extending portion 15 is of such disposition when the disc 14 is in its normal closing relationship that it presents an oblique striking surface similar in disposition to the extension AE of the Fig. 1 embodiment.

In this second embodiment of the invention the valve disc 14 is urged against the casing wall by the rising liquid thereby acting as a barrier preventing the liquid from attaining the level of the air-vent 12.

Having described the invention and the operation thereof, I claim:

1. A check valve device including a tubular casing having an inlet and an exit and an airport through its wall, a valve body supported within said casing and having its inlet disposed across said casing inlet to receive liquid flowing therethrough and its outlet directed toward the airport through the wall of the casing, a pivotally mounted valve disc member biased into normal closing engagement with said body outlet and swingable toward the airport; and an extension of said valve disc member projecting downwardly and obliquely toward said tubular casing adjacent the airport at such an angle when the valve disc is in closing relationship with the valve body that liquid rising in said casing will impinge upon said oblique extension to cause said valve disc member to swing into seating engagement with the airport.

2. A check valve device, including a tubular casing having an inlet and an exit and an airport through said tubular casing, a valve body supported within said casing and having its inlet disposed across said casing inlet to receive liquid flowing therethrough and its outlet directed toward the wall of said casing beneath the airport thereof, a pivotally mounted valve disc member biased into normal closing engagement with said valve body outlet and swingable toward said casing wall; and an extension of said valve disc member projecting downwardly and obliquely toward said tubular casing adjacent the airport at such an angle when the valve disc is in closing relationship with the valve body that liquid rising in said casing will impinge upon said oblique extension to cause said valve disc member to swing toward and seat against said tubular casing beneath said airport to prevent egress of liquid therethrough.

JESSE D. LANGDON.